(12) United States Patent
Koyama et al.

(10) Patent No.: US 9,720,407 B2
(45) Date of Patent: Aug. 1, 2017

(54) SUBSTRATE PROCESSING SYSTEM, SUBSTRATE PROCESSING APPARATUS AND METHOD FOR ACCUMULATING DATA FOR SUBSTRATE PROCESSING APPARATUS

(71) Applicant: Hitachi Kokusai Electric Inc., Tokyo (JP)

(72) Inventors: Yoshitaka Koyama, Toyama (JP); Hiroyuki Iwakura, Toyama (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 497 days.

(21) Appl. No.: 14/309,460

(22) Filed: Jun. 19, 2014

(65) Prior Publication Data

US 2014/0303769 A1    Oct. 9, 2014

Related U.S. Application Data

(63) Continuation of application No. PCT/JP2012/081471, filed on Dec. 5, 2012.

(30) Foreign Application Priority Data

Dec. 20, 2011    (JP) .................................. 2011-278569

(51) Int. Cl.
*G05B 23/02*    (2006.01)
*G06F 11/30*    (2006.01)

(52) U.S. Cl.
CPC ..... *G05B 23/0208* (2013.01); *G05B 23/0264* (2013.01); *G06F 11/3003* (2013.01); *G05B 2219/2602* (2013.01)

(58) Field of Classification Search
CPC .................................................. G05B 23/0264
USPC .......................................................... 702/188
See application file for complete search history.

(56) References Cited

U.S. PATENT DOCUMENTS 9,104,196 B2 *   8/2015   Koyama ........... G05B 19/41875
2004/0021856 A1 *   2/2004   Nishiyama ............. G01N 21/94
                                                                          356/237.2
2010/0023151 A1   1/2010   Shieh et al.

FOREIGN PATENT DOCUMENTS

JP    2011-518425 A    6/2011
JP    2011-181666 A    9/2011
WO    2011/099458 A1    8/2011

* cited by examiner

*Primary Examiner* — Bryan Bui
(74) *Attorney, Agent, or Firm* — Volpe and Koenig, P.C.

(57) ABSTRACT

A substrate processing system includes a monitored data receiving unit receiving a plurality of types of monitored data; a temporary memory unit periodically storing the monitored data; a monitored data rate detection unit detecting, as a monitored data rate, a total number of times each type of monitored data changes during a first time period by more than a predetermined amount; a monitored data writing allocation unit allocating a storing frequency to each type of monitored data based on the monitored data rate and an upper limit; a monitored data writing unit writing the monitored data to the temporary memory unit during the second time period based on the storing frequency; an accumulative memory unit storing the monitored data for a plurality of periods; and an accumulative data writing unit reading the monitored data for every third time period and storing the monitored data in the accumulative memory unit.

10 Claims, 7 Drawing Sheets

FIG. 5

| DATA SENSOR ID | PRIORITY | DATA TICKET DISTRIBUTION AND ALLOCATION FOR ONE SECOND (UNIT OF 100 ms) | | | | | | | | | |
|---|---|---|---|---|---|---|---|---|---|---|---|
| | | 000 | 100 | 200 | 300 | 400 | 500 | 600 | 700 | 800 | 900 |
| 0001 | 1 | ∨ | ∨ | ∨ | ∨ | ∨ | ∨ | ∨ | ∨ | ∨ | ∨ |
| ... | | | | | | | | | | | |
| 0100 | 1 | ∨ | ∨ | ∨ | ∨ | ∨ | ∨ | ∨ | ∨ | ∨ | ∨ |
| 0101 | 2 | ∨ | — | ∨ | — | — | ∨ | — | ∨ | — | — |
| 0102 | 2 | — | ∨ | — | ∨ | — | — | ∨ | — | ∨ | — |
| 0103 | 2 | — | — | ∨ | — | ∨ | ∨ | — | ∨ | — | ∨ |
| 0104 | 2 | ∨ | ∨ | — | ∨ | — | — | ∨ | — | ∨ | — |
| 0105 | 2 | — | — | ∨ | — | ∨ | ∨ | ∨ | — | — | ∨ |
| 0106 | 2 | ∨ | — | ∨ | — | ∨ | ∨ | — | ∨ | — | — |
| ... | | | | | | | | | | | |
| 1999 | 3 | — | — | — | ∨ | — | — | — | — | ∨ | — |
| 2000 | 3 | — | — | — | — | ∨ | — | — | — | — | ∨ |

FIG. 6

| DATA SENSOR ID | PRIORITY | DATA TICKET DISTRIBUTION AND ALLOCATION FOR ONE SECOND (UNIT OF 100 ms) | | | | | | | | | |
|---|---|---|---|---|---|---|---|---|---|---|---|
| | | 000 | 100 | 200 | 300 | 400 | 500 | 600 | 700 | 800 | 900 |
| 0001 | 1 | ✓ | ✓ | ✓ | ✓ | ✓ | ✓ | ✓ | ✓ | ✓ | ✓ |
| 0002 | 2 | ✓ | ✓ | ✓ | ✓ | ✓ | ✓ | ✓ | ✓ | ✓ | ✓ |
| 0003 | 2 | ✓ | ✓ | ✓ | ✓ | ✓ | ✓ | ✓ | ✓ | ✓ | ✓ |
| ... | | | | | | | | | | | |
| 0499 | 3 | ✓ | ✓ | ✓ | ✓ | | ✓ | ✓ | ✓ | ✓ | ✓ |
| 0500 | 3 | ✓ | ✓ | ✓ | ✓ | | ✓ | ✓ | ✓ | ✓ | ✓ |

FIG. 7

| DATA SENSOR ID | PRIORITY | DATA TICKET DISTRIBUTION AND ALLOCATION FOR ONE SECOND (UNIT OF 100 ms) | | | | | | | | | |
|---|---|---|---|---|---|---|---|---|---|---|---|
| | | 000 | 100 | 200 | 300 | 400 | 500 | 600 | 700 | 800 | 900 |
| 0001 | 1 | ✓ | ✓ | ✓ | ✓ | ✓ | ✓ | ✓ | ✓ | ✓ | ✓ |
| 0002 | 2 | ✓ | — | ✓ | — | — | ✓ | — | — | ✓ | — |
| 0003 | 2 | — | ✓ | — | ✓ | ✓ | — | ✓ | ✓ | — | ✓ |
| 0004 | 2 | ✓ | — | ✓ | — | ✓ | — | — | — | — | — |
| 0005 | 2 | — | ✓ | — | ✓ | — | ✓ | ✓ | — | ✓ | — |
| 0006 | 2 | — | — | ✓ | — | ✓ | — | ✓ | — | — | ✓ |
| ... | | | | | | | | | | | |
| 1499 | 3 | — | — | — | ✓ | — | — | ✓ | — | — | ✓ |
| 1500 | 3 | ✓ | — | — | — | ✓ | — | — | ✓ | — | — |

SUBSTRATE PROCESSING SYSTEM, SUBSTRATE PROCESSING APPARATUS AND METHOD FOR ACCUMULATING DATA FOR SUBSTRATE PROCESSING APPARATUS

CROSS-REFERENCE TO RELATED PATENT APPLICATION

This application is a continuation of International Application No. PCT/JP2012/081471 filed on Dec. 5, 2012 which claims priority under 35 U.S.C. §119 to Japanese Application No. 2011-278569 filed on Dec. 20, 2011, the entire contents of which are hereby incorporated by reference.

BACKGROUND OF THE INVENTION

1. Field of the Invention

The present invention relates to a substrate processing system or a monitored data collection system collecting and accumulating monitored data, for example, a processing temperature or a pressure in a processing chamber, etc., which is outputted from a substrate processing apparatus processing a substrate, for example, a semiconductor wafer, etc.

2. Description of the Related Art

FIG. 1 is a perspective view illustrating a manufacturing apparatus of a semiconductor device (semiconductor manufacturing apparatus), which is a substrate processing apparatus. The substrate processing apparatus shown in FIG. 1 may include component units of the substrate processing apparatus such as a load port 114 loading and unloading pods 110 which is a substrate accommodating unit accommodating a plurality of wafers (substrates), a pod opener 121 detaching caps of the pods 110, a rotating shelf 105 temporarily preserving the pods 110, a pod transfer unit 118 transferring the pods 110, a boat 217 stacking and mounting the wafers, a wafer transfer instrument 125 performing transfer of the wafers between the pods 110 loaded on a placing board 122 of the pod opener 121 and the boat 217, a thermal processing furnace 202 including a substrate processing chamber (not shown) or a heater (not shown), a boat elevator 115 loading the boat 217 into and unloading the boat 217 from the thermal processing furnace 202, a storing unit (not shown), etc., and a control unit (not shown) controlling each of the component units. The control unit may perform wafer processing such as heat treatment, etc. based on a process recipe stored in the memory unit.

A conventional substrate processing apparatus may constantly or periodically collect monitor information including sensor information such as a temperature measurement value or a pressure value, etc. in the thermal processing furnace 202, and actuator information such as a status of a switching operation, etc. of an on-off value installed in a processing gas supply pipe supplying a processing gas to the thermal processing furnace 202 while performing the process recipe, etc. in a monitor information collecting unit installed in the substrate processing apparatus, transmit the collected information to a monitored data analysis system disposed outside the substrate processing apparatus, accumulate the transmitted information by recording the collected information in a database consisting of a non-volatile memory medium such as a hard disk drive (HDD), etc. included in the system, and use the accumulated information for error analysis when an error occurs or data analysis of substrate processing data, etc.

Meanwhile, in order to improve performance of the substrate processing apparatus, an increase in the number of monitored data collecting sensors or an increase of a sampling period for collecting sensor data is performed, for example, the sampling period is increased to 1 Hz to 10 Hz, or 100 Hz. In this case, an amount of monitored data is increased according to the increase of the number of monitored data collecting sensors or the increase of the sampling period for collecting the sensor data. However, in the conventional art, when the amount of monitored data is increased, much work such as a change of control software of the system, etc. is required since the system cannot flexibly respond to the increase of the amount of monitored data the system receives.

SUMMARY OF THE INVENTION

In the above substrate processing process, a substrate processing system or a monitored data collecting and accumulating system which does not require control software of the system to be changed can respond to an increase of an amount of the monitored data, and can prevent leakage of data accumulation or a system down is provided, even when the amount of monitored data is increased according to an increase of the number of sensors for collecting the monitored data or an increase of a sampling period for collecting sensor data.

According to an aspect of the present invention, there is provided a substrate processing system including: a substrate processing apparatus configured to process a substrate; a monitored data receiving unit configured to receive a plurality of types of monitored data outputted from the substrate processing apparatus; a temporary memory unit configured to periodically store the plurality of types of monitored data received by the monitored data receiving unit; a monitored data rate detection unit configured to detect, as a monitored data rate, a total number of times each type of monitored data received by the monitored data receiving unit changes during a first time period by more than a predetermined amount; a monitored data writing allocation unit configured to allocate, to each type of monitored data, a storing frequency corresponding to number of times each type of monitored data of one period is written to the temporary memory unit during a second time period based on the monitored data rate detected by the monitored data rate detection unit and an upper limit of the storing frequency corresponding to a total storing frequency of the monitored data stored in the temporary memory unit during the one period; a monitored data writing unit configured to write the plurality of types of monitored data received by the monitored data receiving unit to the temporary memory unit during the second time period based on the storing frequency allocated by the monitored data writing allocation unit; an accumulative memory unit configured to store the plurality of types of monitored data stored in the temporary memory unit for a plurality of periods; and an accumulative data writing unit configured to read the plurality of types of monitored data stored in the temporary memory unit for every third time period and to store the monitored data in the accumulative memory unit.

BRIEF DESCRIPTION OF THE DRAWINGS

FIG. 5 is a ticket distribution table according to a first embodiment of the present invention;

FIG. 6 is a ticket distribution table according to a second embodiment of the present invention; and FIG. 7 is a ticket distribution table according to a third embodiment of the present invention.

DETAILED DESCRIPTION OF THE PREFERRED EMBODIMENTS

Figure 1:
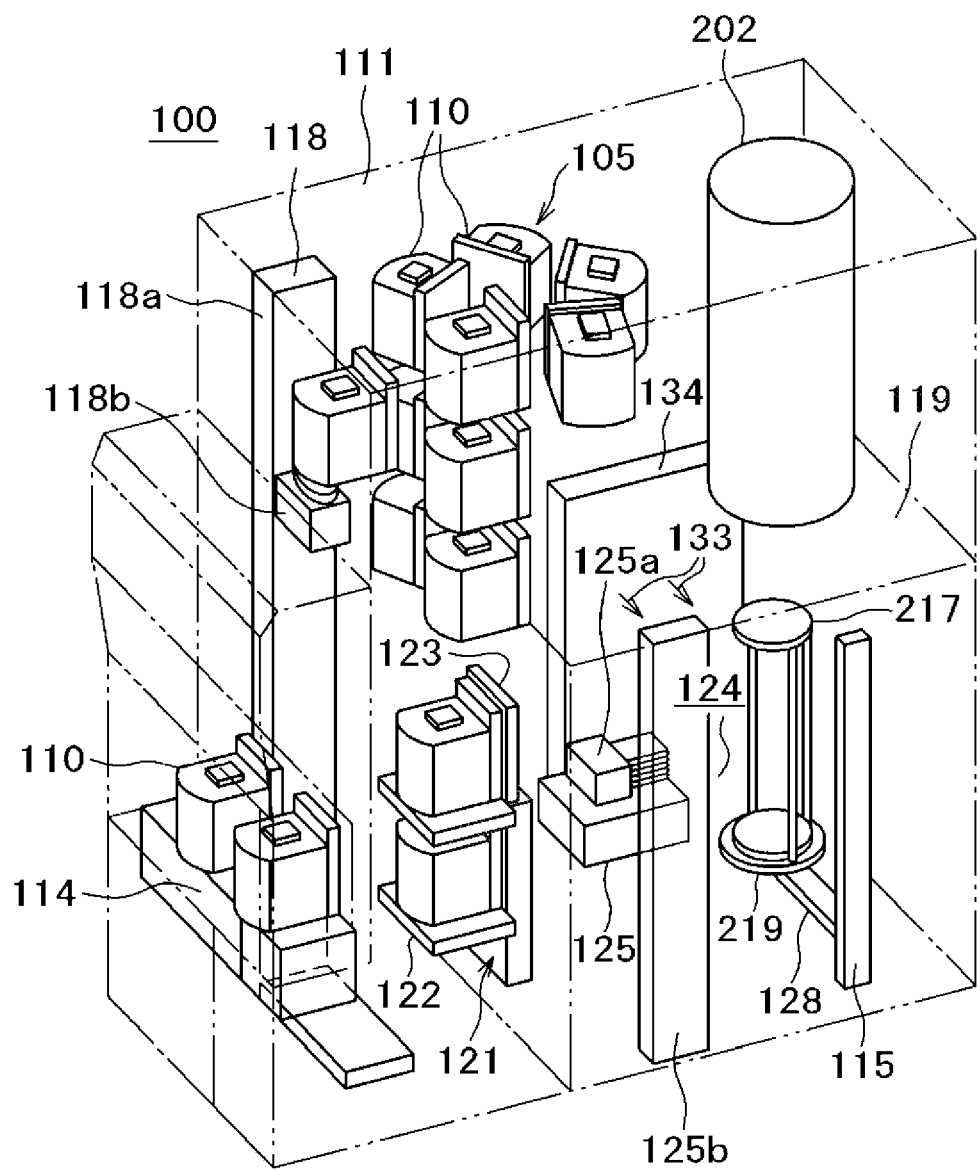
FIG. 1 is a perspective view of a substrate processing apparatus according to an embodiment of the present invention.

Hereinafter, a substrate processing apparatus according to an embodiment of the present invention will be described with reference to the accompanying drawings. In the embodiment, for example, the substrate processing apparatus may be configured as a semiconductor manufacturing apparatus performing a process in a manufacturing method of a semiconductor device (an integrated circuit (IC)). In addition, hereinafter, an example in which a batch-type vertical semiconductor manufacturing apparatus (simply referred to hereinafter as a processing apparatus) performing an oxidation process, a diffusion process, or a chemical vapor deposition (CVD) process, etc. in a substrate is used as the substrate processing apparatus will be described. FIG. 1 is a perspective view of a processing apparatus to which the present invention is applied. Further, FIG. 2 is a perspective view of a vertical cross-section of the processing apparatus shown in FIG. 1.

Figure 2:
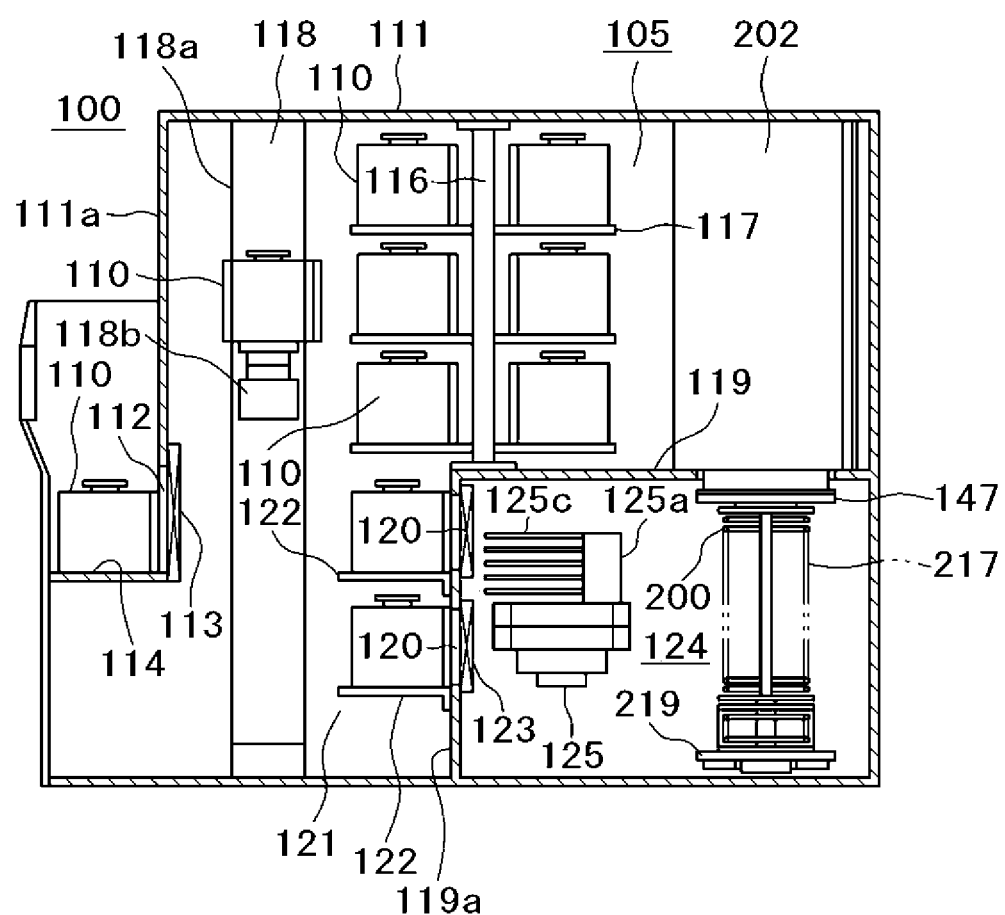
FIG. 2 is a vertical cross-sectional view of a substrate processing apparatus according to an embodiment of the present invention.

As shown in FIG. 2, a processing apparatus 100 according to an embodiment of the present invention may use a pod 110 as a wafer carrier storing wafers 200 (substrates) formed of silicon, etc., and include a case 111. A pod transfer port 112 may be installed in a front wall 111a of the case 111 to enter the pod inside and outside the case 111, and may be opened and closed by a front shutter 113. A load port 114 may be installed in a frontal side of the pod transfer port 112, and the load port 114 may place the pod 110. The pod 110 may be loaded into the load port 114 by a transfer unit (not shown) during a process, and may be unloaded from the load port 114.

A rotating shelf 105 may be installed above substantially a center portion in a longitudinal direction in the case 111, the rotating shelf 105 may rotate around a support 116, and a plurality of pods 110 may be kept on a shelf board 117. As shown in FIG. 2, a pod transfer unit 118 may be installed between the rotating shelf 105 and the load port 114 in the case 111. The pod transfer unit 118 may include a pod elevator 118a capable of going up and down while holding the pods 110, and a pod transfer instrument 118b as a horizontal transfer instrument, and transfer the pods 110 between the load port 114, the rotating shelf 105, and the pod opener 121.

As shown in FIG. 2, a sub case 119 may be installed at a rear end side area below the center portion in a longitudinal direction in the case 111. A pair of wafer transfer ports 120 for entering the wafers 200 inside and outside the sub case 119 may be installed in a frontal wall 119a of the sub case 119, and be vertically disposed in two stairs. A pair of pod openers 121 may be installed in upper and lower wafer transfer ports 120, respectively. The pod opener 121 may include placing boards 122 placing the pods 110, and cap detaching instruments 123 detaching caps of the pods 110.

The pod opener 121 may open and close the wafer transfer ports 120 by detaching the cap of the pods 110 placed on the placing boards 122 by the cap detaching instruments 123. The placing board 122 may be a placing shelf on which the substrate accommodating unit is placed when placing the substrate.

As shown in FIG. 2, the sub case 119 may constitute a transfer chamber 124 isolated from an atmosphere of an installation space of the pod transfer unit 118 or the rotating shelf 105. A wafer transfer instrument 125 may be installed in a front side area of the transfer chamber 124. The wafer transfer instrument 125 may include a wafer transfer unit 125a capable of rotating or moving in a horizontal direction by placing the wafer 200 in tweezers 125c, and a wafer transfer unit elevator 125b for moving up and down the wafer transfer unit 125a. The wafer 200 may be loaded into and unloaded from a boat 217 by a continuous operation of the wafer transfer unit elevator 125b and the wafer transfer unit 125a.

As shown in FIG. 1, a clean unit 134 constituted by a supply fan and a dust proof filter for supplying a clean atmosphere or clean air 133 which is an inert gas may be installed in the transfer chamber 124. As shown in FIG. 2, the processing furnace 202 may be installed above the boat 217. A substrate processing chamber (not shown) may be included in the processing furnace 202, and a heater (not shown) for heating the inside of the substrate processing chamber may be installed around the substrate processing chamber. A lower end part of the processing furnace 202 may be opened and closed by a furnace gate valve 147.

As shown in FIG. 1, a boat elevator 115 may be installed to move the boat 217 up and down. A seal cap 219 may be horizontally installed in an arm 128 connected to the boat elevator 115, vertically support the boat 217, and be configured to seal the lower end part of the processing furnace 202. The boat 217 may include a plurality of supporting members, and be configured to horizontally support the plurality of wafers 200 (for example, about 50 to 125 wafers), which are vertically aligned in center.

Next, an operation of the processing apparatus according an embodiment of the present invention will be described. As shown in FIGS. 1 and 2, when the pod 110 is supplied to the load port 114, the pod transfer port 112 may be opened by a front shutter 113, and the pod 110 may enter the pod transfer port 112. The pod 110 that has entered may be automatically transferred and delivered to a specified shelf board 117 of the rotating shelf 105 by the pod transfer unit 118.

After the pod 110 is temporarily kept on the rotating shelf 105, the pod 110 may be transferred to one pod opener 121 from the shelf board 117 and be transferred to the placing board 122, or may be directly transferred from the load port 114 to the pod opener 121 and be transferred to the placing board 122. At this time, the wafer transfer port 120 of the pod opener 121 may be sealed by the cap detaching instrument 123, and the clean air 133 may be circulated and fill the transfer chamber 124.

As shown in FIG. 2, the cap of the pod 110 placed on the placing board 122 may be removed by the cap detaching instrument 123, and the wafer transfer port 120 of the pod 110 may be opened. Further, the wafer 200 may be picked up by the wafer transfer unit 125a, and be loaded by being transferred to the boat 217. The wafer transfer unit 125a delivering the wafer 200 to the boat 217 may go back to the pod 110 and load a next wafer 200 into the boat 217.

An opening operation of the pod 110 by the pod opener 121 may be simultaneously performed by transferring another pod 110 from the rotating shelf 105 or the load port 114 by the pod transfer unit 118 in the pod opener 121 located in the other side (lower end or upper end) while loading the wafer 200 into the boat 217 by the wafer transfer unit 125a in the pod opener 121 located in one side (upper end or lower end).

When loading a predetermined number of wafers 200 into the boat 217, the lower end part of the processing furnace 202 may be opened by the furnace gate valve 147. Continuously, the seal cap 219 may be moved up by the boat elevator 115, and the boat 217 supported by the seal cap 219 may enter the substrate processing chamber in the processing furnace 202.

After loading, a specified process may be performed on the wafer 200 in the substrate processing chamber. After that, the boat 217 may exit the processing furnace 202 by the boat elevator 115. After that, the wafer 200 and the pod 110 may exit to the outside of the case 111 in the reverse order of that described above.

Figure 3:
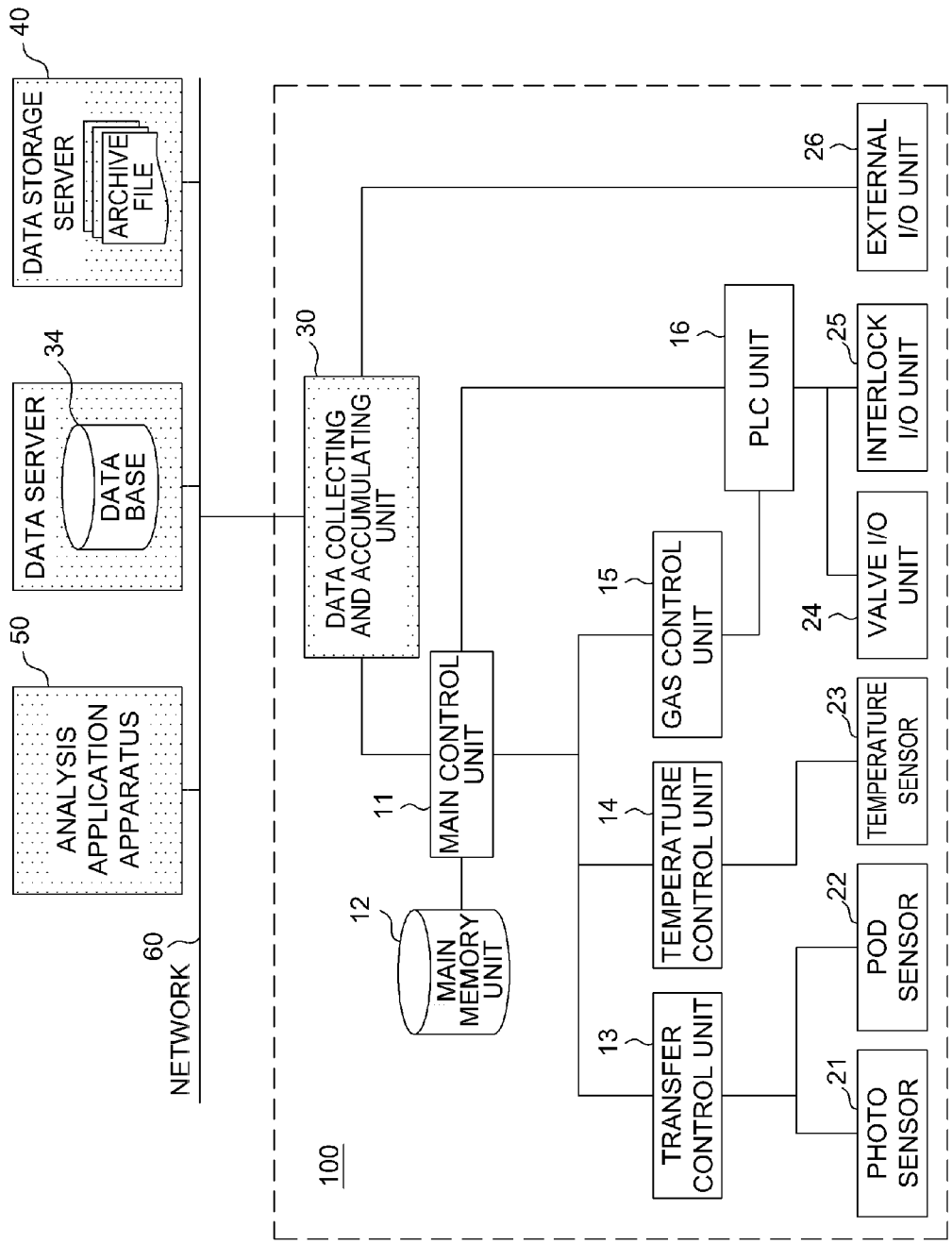
FIG. 3 is a functional block diagram exemplarily illustrating a substrate processing apparatus according to an embodiment of the present invention.

Next, function blocks of the substrate processing apparatus 100 will be described with reference to FIG. 3. FIG. 3 is a functional block diagram exemplarily illustrating a substrate processing apparatus according to an embodiment of the present invention. As shown in FIG. 3, a component unit constituting the substrate processing apparatus 100 including a main memory unit 12, a transfer control unit 13, a temperature control unit 14, a gas control unit 15, a programmable logic controller (PLC) unit 16, a data collecting and accumulating unit 30, an operation unit (not shown) receiving instructions of an operator, a display unit (not shown) displaying an operating screen or various data, etc., and so on may be electrically connected to a main control unit 11 of the substrate processing apparatus 100. Specifically, the main control unit 11 and a subcontrol unit including the transfer control unit 13, the temperature control unit 14, the gas control unit 15, etc. may be connected by a private protocol such as Semiconductor Equipment and Materials International (SEMI) Equipment Communication Standard/High-speed SECS Message Services (SECS/HSMS), or a general transmission control protocol/Internet protocol (TCP/IP), Extensible Markup Language/Simple Object Access Protocol (XML/SOAP), etc.

The transfer control unit 13 may control a position of the pod transfer unit 118, the wafer transfer instrument 125, or the boat elevator 115, etc., a photo sensor 21 or a pod sensor 22 may be electrically connected to the transfer control unit 13, and for example, the transfer control unit 13 may receive data regarding presence or a position of the pod 110 accommodating the wafer 200 from the sensors, and transmit the received data to the main control unit 11. Further, for example, the transfer control unit 13 may receive a transfer instruction of the pod 110 from the main control unit 11, and transfer the pod 110 to the location or position instructed by the transfer instruction.

The temperature control unit 14 may control a temperature of a heater heating the processing furnace 202, receive temperature data from a temperature sensor 23 measuring a temperature in the processing furnace 202, and transmit the received temperature data to the main control unit 11. In addition, for example, the temperature control unit 14 may receive a heating temperature instruction of the heater for increasing the temperature in the processing furnace 202 from the main control unit 11, and operate the heater to increase the temperature as instructed through the heating temperature instruction.

For example, the gas control unit 15 may transmit data received from a valve input/output (I/O) unit 24 or an interlock input/output (I/O) unit 25 through the PLC unit 16 to the main control unit 11, and transmit the data received from the main control unit 11 to the valve I/O unit 24 or the interlock I/O unit 25. Specifically, for example, the gas control unit 15 may receive gas flow data from a mass flow controller (MFC: a flow control unit) installed in a processing gas supply pipe for supplying a processing gas in the processing furnace 202, and transmit the received gas flow data to the main control unit 11. In addition, for example, the gas control unit 15 may receive a gas control instruction such as a valve open and close instruction or a pump drive instruction, etc. with respect to an on-off valve installed in the processing gas supply pipe or a pressure adjustment valve or pump installed in a processing gas exhaust pipe exhausting the gas from the processing furnace 202 from the main control unit 11, and perform gas control according to the instruction. The PLC unit 16 may transmit data received from the valve I/O unit 24 or the interlock I/O unit 25 to the main control unit 11, and also transmit data received from the main control unit 11 to the valve I/O unit 24 or the interlock I/O unit 25. The main memory unit 12 may store a process recipe which is a substrate processing sequence of the substrate processing apparatus 100, and consist of a hard disk, a semiconductor memory device, or the like.

The main control unit 11 may include a memory storing an operating program of a central processing unit (CPU) and the main control unit 11 as a hardware construction, and the CPU may read and operate to perform the process recipe stored in the main memory unit 12 according to the operating program. Further, each of the transfer control unit 13, the temperature control unit 14, the gas control unit 15, etc., which is included in the subcontrol unit, may also include a CPU and a memory storing an operating program, etc. of each control unit, and each CPU may operate according to the corresponding operating program.

The main control unit 11 may collect monitored data such as a temperature indicated by the temperature sensor or a position of an actuator, etc. from each subcontrol unit such as the transfer control unit 13, etc. or each component unit such as the PLC unit 16, etc., and control each component unit to set an apparatus parameter including a temperature or a pressure, etc. of the processing furnace 202 to a predetermined value using the monitored data. A state of the pod sensor 22 or the temperature sensor 23, etc. may be transmitted from each subcontrol unit to the main control unit 11 as an analog signal or a digital signal through a recommended standard-232C (RS-232C) or a Device Net, etc. When the main control unit 11 collects the monitored data from each component unit, the main control unit 11 may mark a timestamp which is a detection time of the collected monitored data on the collected monitored data, store and preserve the marked monitored data in a non-volatile memory device constituting the main memory unit 12, and also transmit the marked monitored data to the data collecting and accumulating unit 30.

Next, a management system will be described. For example, the data collecting and accumulating unit 30 constituting the substrate processing apparatus 100 may be connected to the main control unit 11 by a file transfer protocol such as a SECS/HSMS or a file transfer protocol (FTP), or a network file sharing protocol, etc. Further, in an example of FIG. 3, the data collecting and accumulating unit 30 may be electrically connected to an external input/output (I/O) unit 26, and be configured to collect a state of an external sensor through the external I/O unit 26. The data collecting and accumulating unit 30 may receive the monitored data collected from each component unit of the substrate processing apparatus 100 or the external I/O unit 26 from the main control unit 11, and transmit the received monitored data to a host computer which is the management computer of the substrate processing apparatus 100 or a group management computer managing a plurality of substrate processing apparatuses 100.

In an example of FIG. 3, the data collecting and accumulating unit 30 may be electrically connected to a database 34 which is an accumulative memory unit, a data storage server 40, and an analysis application apparatus 50 via a network 60. Further, as will be described later, the database 34 may constitute a portion of the data collecting and accumulating unit 30. The data collecting and accumulating unit 30 may collect the monitored data from each component unit constituting the processing apparatus 100 via the main control unit 11, temporarily store the collected monitored data, and accumulatively store the temporarily stored data in the database 34. Accordingly, it may be possible for the management computer (for example, the analysis application apparatus 50) to use the accumulatively stored data in the database 34. Further, in an embodiment of the present invention, although the data collecting and accumulating unit 30 is installed inside the substrate processing apparatus 100 rather than the database 34, the data collecting and accumulating unit 30 may be installed outside the substrate processing apparatus 100. Further, alternatively, the database 34 may be installed inside the substrate processing apparatus 100.

In the embodiment of the present invention, since the data collecting and accumulating unit 30 which is separated and independent from the substrate processing control system of the substrate processing apparatus 100 and collects only the monitored data may be installed inside the substrate processing apparatus 100, and the data collecting and accumulating unit 30 and the management system (the data storage server 40, the analysis application apparatus 50) are connected, detailed monitored data which could not be acquired in a conventional substrate processing control system may be acquired in the management system, and be analyzed and used by the analysis application apparatus 50. The data collecting and accumulating unit 30 will be described in detail later.

The data accumulated and stored in the database 34 may be transmitted to and stored in the non-volatile memory device of the data storage server 40, etc. as needed, and data regarding a temperature, a gas flow rate, or a pressure, etc. of the preserved processing furnace 202 may be used in data processing for monitoring the substrate processing apparatus 100 such as statistical analysis or multivariate analysis, etc. by the analysis application apparatus 50 having an advanced application function. The analysis application apparatus 50 may be constituted as a personal computer (PC) connected to the network 60, or may be constituted as a client-server type application apparatus or have a construction using a web browser, etc. Further, the analysis application apparatus 50 may be constituted independently from the network 60.

Figure 4:
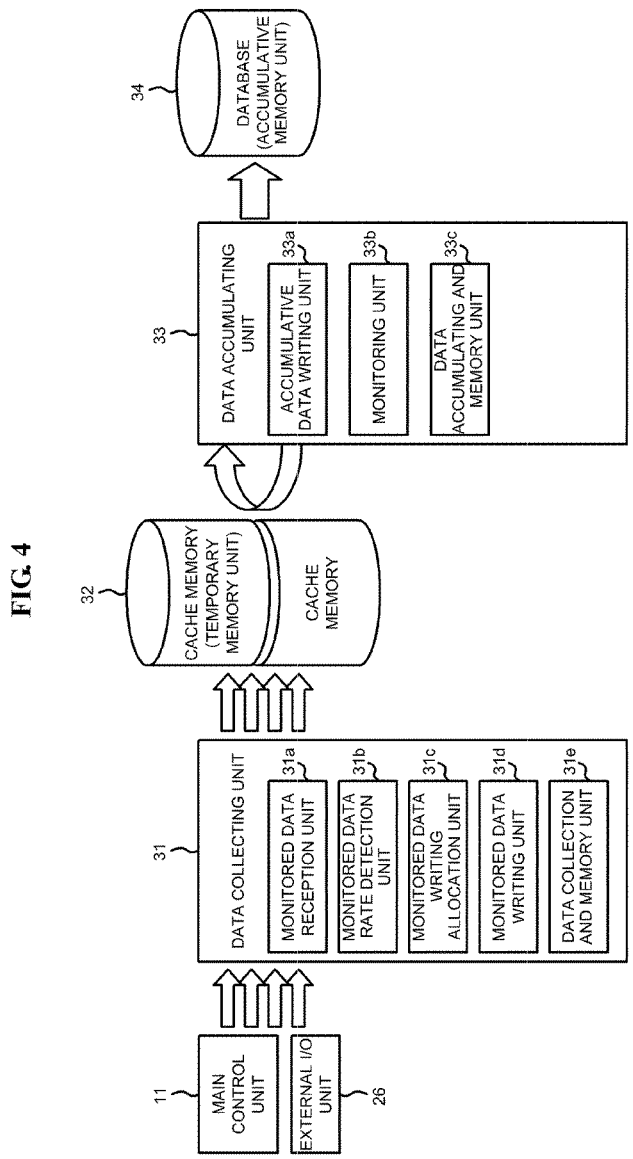
FIG. 4 is a functional block diagram illustrating a data collecting and accumulating unit according to an embodiment of the present invention.

Next, functional blocks of the data collecting and accumulating unit 30 according to an embodiment of the present invention will be described with reference to FIG. 4. FIG. 4 is a functional block diagram illustrating the data collecting and accumulating unit 30 according to an embodiment of the present invention. The data collecting and accumulating unit 30 (data collecting and accumulating means) may include a data collecting unit 31 (data collecting means), a cache memory 32 (temporary memory means) which is a temporary memory unit, a data accumulating unit 33 (data accumulating means), and an operation display unit (not shown) receiving an input setting of instructions or various parameters, etc. from an operator with respect to the data collecting and accumulating unit 30.

First, a summary of the data collecting and accumulating unit 30 will be described. For example, the main control unit 11 or the external I/O unit 26 may transmit each of monitored data to the data collecting unit 31 when a value of the monitored data that each has collected is changed or a changed amount of the monitored data that each has collected is equal to or more than a predetermined limit. Investigations have shown that an amount of the transmitted monitored data increases or decreases according to an operation state of the substrate processing apparatus 100. For example, when processing (producing) a substrate, since a large amount of the monitored data is changed compared to when waiting, the amount of transmitted monitored data may be increased. Further, while producing, there may be a timing at which the amount of transmitted monitored data is temporarily increased according to the operations of a process. Moreover, the amount of transmitted monitored data may be increased by an increase of various sensors, etc. to improve performance of the substrate processing apparatus 100. When the large amount of monitored data is stored in an HDD of the database 34 or the data storage server 40, an access speed of the HDD may not catch up with the large amount and leakage of data accumulation may occur, or in the worst case, a system down may occur.

Accordingly, it may be necessary to reduce the large amount of monitored data to a proper amount. At this time, the data collecting and accumulating unit 30 may require flexibility which does not need a change of control software with respect to the increase of the monitored data. In this embodiment, the data collecting unit 31 may be provided with a filtering function limiting a range of data needed with respect to the large amount of monitored data. The filtering function may be implemented by a ticket distribution method as offered in a first embodiment, etc. to be described later.

The data collecting unit 31 may receive a plurality of types of monitored data from the main control unit 11 or the external I/O unit 26, and periodically write the received monitored data to the cache memory 32. The received monitored data may include a timestamp which is a detection time of the monitored data. Specifically, according to a total amount of the received monitored data and a data writing upper limit which is an upper limit of a total amount of the monitored data stored in the cache memory 32 during one period, the data collecting unit 31 may adjust an amount of each type of the monitored data written to the cache memory 32, which is a temporary memory unit, allocate the adjusted amount to each type of the monitored data, and write each type of the monitored data to the cache memory 32 based on the allocation. The data collecting unit 31 may have a filtering function limiting a range of data needed with respect to the large amount of monitored data.

Since the cache memory 32 is constituted as a semiconductor memory and writes and reads data at a high speed compared to an HDD constituting the database 34 to be described later, the cache memory 32 may serve as a cushion when accumulating and preserving the large amount of monitored data in the database 34. The data accumulating unit 33 may read the monitored data written to the cache memory 32 in a predetermined time, and write the read monitored data to the database 34, which is an accumulative memory unit.

Next, the data collecting unit 31 will be described in detail. As shown in FIG. 4, the data collecting unit 31 may include a monitored data receiving unit 31a (monitored data receiving means), a monitored data rate detection unit 31b (monitored data rate detection means), a monitored data writing allocation unit 31c (monitored data writing allocation means), a monitored data writing unit 31d (monitored data writing means), and a data collection and memory unit 31e (data collection and memory means).

The monitored data receiving unit 31a may receive a plurality of types of monitored data, for example, temperature data, pressure data, etc. of the processing furnace 202 and a detection time thereof, outputted from the substrate processing apparatus 100.

The monitored data rate detection unit 31b may detect, as a monitored data rate, the total number of times each type of monitored data received by the monitored data receiving unit 31a changes during a first time period by more than a predetermined limit of change. The first time period or the limit of the change may be set through a display unit of the data collecting and accumulating unit 30 by an operator, and may be changeably stored in the data collection and memory unit 31e. For example, when the limit of change in pressure data is 100 Pa and the pressure data is gradually changed from 100 Pa to 1100 Pa over one second, the monitored data rate of the pressure data may be 10 times/sec. Further, when the limit of change in temperature data is 10° C. and the temperature data is gradually changed from 500° C. to 600° C. over one second, the monitored data rate of the temperature data may be 10 times/sec. Accordingly, when the monitored data is only two types of the pressure data and the temperature data, the monitored data rate may be 20 times/sec. Further, in this embodiment, when the monitored data received by the monitored data receiving unit 31a is changed by a predetermined change amount or more in a transmission side of the main control unit 11 or the external I/O unit 26, the transmission side may be configured to transmit the monitored data. Here, the transmission side may always transmit the monitored data, and the monitored data receiving unit 31a may be configured to acquire the monitored data changed by the predetermined change amount or more when receiving the monitored data in the monitored data receiving unit 31a.

The monitored data writing allocation unit 31c may allocate, to each type of the monitored data, the number of times each type of the monitored data of one period is written to the cache memory 32 during a second time period based on the monitored data rate detected by the monitored data rate detection unit 31b and the data writing upper limit which is an upper limit of a total amount of the monitored data stored in the cache memory 32 during the one period. Further, the monitored data writing allocation unit 31c may allocate, to each type of the monitored data, the number of times each type of the monitored data of the one period is written to the cache memory 32 during the second time period based on a priority of each type of the monitored data stored in the data collection and memory unit 31e to be described later together with the data writing upper limit and the monitored data rate. The second time period may be previously set through the display unit of the data collecting and accumulating unit 30 by the operator, and may be changeably stored in the data collection and memory unit 31e.

Further, the monitored data writing allocation unit 31c may perform allocation such that the number of times a type of monitored data with a high priority is written to the cache memory 32 during the second time period is greater than the number of times a type of monitored data with a low priority is written to the cache memory 32 during the second time period based on the priority of each type of the monitored data stored in the data collection and memory unit 31e. Moreover, the monitored data writing allocation unit 31c may store the allocated number of times in the data collection and memory unit 31e. In addition, the priority may be previously set in the operation and display unit of the data collecting and accumulating unit 30 by the operator, and may be changeably stored in the data collection and memory unit 31e.

For example, the amount of monitored data capable of being stored in the cache memory 32 during the one period may be 10 points/period, and the data writing upper limit may be 10 points/sec when one period is one second. In this case, as described above, when the monitored data rate of each of the pressure data and the temperature data is 10 times/sec and a total monitored data rate is 20 times/sec, the monitored data writing allocation unit 31c may allocate 5 times/sec to the number of times each of the pressure data and the temperature data is written the cache memory 32 in case of the pressure data and the temperature data having the same priority. However, the monitored data writing allocation unit 31c may allocate different value to the number of times the pressure data and the temperature data written to the cache memory 32 according to the priority when the pressure data and the temperature data have different priorities. A detailed description of this will be described in embodiments to be described later.

The monitored data writing unit 31d may write the plurality of types of monitored data received by the monitored data receiving unit 31a to the cache memory 32 during the second time period based on the allocated number of times by the monitored data writing allocation unit 31c.

The data collection and memory unit 31e may store a ticket distribution table which indicates the number of times each type of the monitored data is written to the cache memory 32 of one period during the second time period allocated to each type of the monitored data by the monitored data writing allocation unit 31c. For example, as described above, the monitored data writing allocation unit 31c may store a purpose when allocating 5 times/sec to the number of times each of the pressure data and the temperature data is written to the cache memory 32. A detailed description of this will be described in a later embodiment. Further, the data collection and memory unit 31e may store the priority of each of the plurality of types of monitored data used when the monitored data writing allocation unit 31c allocates the number of times each type of the monitored data is written. Further, the data collection and memory unit 31e may store the first time period, the limit of a change amount of the monitored data, and the second time period described above.

Next, the data accumulating unit 33 will be described in detail. As shown in FIG. 4, the data accumulating unit 33 may include an accumulative data writing unit 33a (accumulative data writing means), a monitoring unit 33b (monitoring means), and an accumulative data memory unit 33c (data accumulation and memory means). The accumulative data writing unit 33a may read the monitored data which is periodically written to the cache memory 32 of a plurality of periods for, for example, every third time period, and write and accumulate the read monitored data to the accumulative memory unit (database) 34 which is the accumulative memory unit. The third time period may be previously set through the display unit of the data collecting and accumulating unit 30 by the operator, may be changeably stored in the accumulative data memory unit 33c. For example, the monitored data may be periodically written to the cache memory 32 every one second, the written monitored data for 10 periods may be read once every 10 seconds, and the read monitored data may be written and accumulated to the database 34 which is the accumulative memory unit.

The monitoring unit 33b may monitor an amount of accumulated data transmitted from the cache memory 32 to the database 34 which is the accumulative memory unit, and control the accumulative data writing unit 33a to extend a period of reading the monitored data stored in the cache memory 32 and writing the monitored data to the database 34 which is the accumulative memory unit when the transmitted amount of the accumulated data is determined to exceed a predetermined amount. The accumulative data memory unit 33c may store the plurality of types of monitored data by matching the third period described above with the amount of the accumulated data transmitted from the cache memory 32 to the database 34, which is the accumulative memory unit.

A First Embodiment

Next, a first embodiment will be described with reference to FIG. 5. FIG. 5 illustrates a monitored data writing allocation table during the one period (one second in the example of FIG. 5) stored in the data collection and memory unit 31e, which is a ticket distribution table for writing the monitored data during the one period (one second), according to the first embodiment of the present invention. The ticket distribution may be the writing allocation. In FIG. 5, a priority may be set with respect to each of 2000 sensors transmitting the monitored data, and a ticket may be distributed, that is, the writing allocation with respect to the cache memory 32 may be performed. The ticket distribution is shown with check marks. For example, the tickets may be distributed every 100 ms with respect to data transmitted from each of sensors having sensor identifiers (IDs) 0001 to 0100 with a first priority, and the number of tickets corresponding to one period may be 10 for each sensor. The tickets may be distributed to data transmitted from each of sensors having sensor IDs 0101 to 0106 of the second priority every 200 ms or 300 ms, and the number of tickets corresponding to one period may be 4 for each sensor. The tickets may be distributed to data transmitted from each of sensors having sensor IDs 1999 and 2000 of the third priority for every 500 ms, and the number of tickets corresponding to one period may be 2 for each sensor.

According to the ticket distribution table, data transmitted from the sensors having the sensor IDs 0001 to 0100, 0101, 0104, 0106, . . . may be written to the cache memory 32 between 000 ms and 100 ms of one period (one second), data transmitted from the sensors having the sensor IDs 0001 to 0100, 0102, 0105, . . . may be written to the cache memory 32 between 100 ms and 200 ms of one period (one second), similarly, data transmitted from corresponding sensors may be written to the cache memory 32 for every 100 ms between 200 ms and 900 ms of the one period (one second), and lastly, data transmitted from sensors having sensor IDs 0001 to 0100, 0103, 0105, . . . may be written to the cache memory 32 between 900 ms and 1000 ms. In the first embodiment, the ticket distribution method may be used in order to filter the monitored data written to the cache memory 32.

In the first embodiment, prerequisites may be set as follows. (1) There may be 2000 sensors transmitting the monitored data, and the sensor IDs may be 0001 to 2000. (2) A period of writing the monitored data from the 2000 sensors to the cache memory 32 may be one second. That is, after writing the monitored data of an amount corresponding to the ticket distributed based on the ticket distribution to the cache memory 32, a period until the monitored data of an amount corresponding to the ticket distributed based on a next ticket distribution is written to the cache memory 32 may be one second. (3) A data writing upper limit of the cache memory 32 may be 5000 points/sec. That is, the write of data to the cache memory 32 may be performed a maximum of 5000 times a second. The data writing upper limit may be determined by the cache memory 32 or a central processing unit (CPU), etc. which writes the data to the cache memory 32. Accordingly, there may be 5000 tickets distributing write timing of monitored data to the cache memory 32. (4) Data with the first priority may be data transmitted from sensors having sensor IDs 0001 to 0100, and a change of the data may be recorded in the cache memory 32.

Under the prerequisites described above, in the embodiment of FIG. 5, the monitored data rate detection unit 31b may accumulate a monitored data rate, which is monitored data collection points per period (one second), for every one period (one second) which is the first time period, and the monitored data writing allocation unit 31c may allocate and distribute the ticket of an amount corresponding to one period (one second) which is the second time period with respect to each monitored data of a next one period (one second) based on the accumulated monitored data rate. A detailed description of the accumulation of the monitored data rate and the ticket distribution is as follows. (1) In an embodiment of FIG. 5, since each type of the monitored data from 2000 sensors changes by the predetermined change amount or more for every 100 ms, the monitored data rate is 2000×1 sec/0.1 sec=20000/sec. For example, since the pressure data of the processing furnace 202 is changed to 1000 Pa for one second, the change equal to or more than 100 Pa which is the predetermined change amount may be repeated every 100 ms.

(2) The data with the first priority may be data transmitted from the sensors having the sensor IDs 0001 to 0100, and since every change of the data may be written to the cache memory 32, the data with the first priority may be updated every 100 ms, that is, may be written to the cache memory 32 every 100 ms. Accordingly, since 10 tickets per one type of data are distributed to the data with the first priority, the 1000 tickets may be distributed to every type of data with the first priority. Further, the data with the first priority may be previously registered in the data collection and memory unit 31e from the operation and display unit of the collecting and accumulating unit 30 by the operator, and the monitored data writing allocation unit 31c may distribute the tickets based on the registered data with the first priority.

(3) The data with other priorities than the first priority may be data transmitted from the sensors having sensor IDs 0101 to 2000, and the remaining 4000 tickets may be allocated to the data with the other priorities at equal time intervals by a round robin method after the allocation in (2) above. Accordingly, since 2 tickets per one type of data are distributed to data excluding the data transmitted from the sensors with the first priority, 3800 tickets may be distributed to every type of data excluding the data transmitted from the sensors with the first priority. Accordingly, a total of 4800 (1000+3800) tickets may be distributed, and 200 tickets may remain.

(4) Further, after the allocation in (3) above, the 200 remaining tickets may be allocated to data excluding the data transmitted from the sensors with the first priority in increasing order of the sensor IDs to have as similar time intervals as possible. The data to which the remaining tickets are allocated may be data with the second priority, and data to which the remaining tickets are not allocated may be data with the third priority. In the embodiment of FIG. 5, since the 200 remaining tickets are allocated to each of 100 types of data transmitted from the sensors having the sensor IDs 0101 to 0200 by twos, the data with the second priority may be data transmitted from the sensors having the sensor IDs 0101 to 0200 and the data with the third priority may be data (1800 data) transmitted from the sensors having the sensor IDs 0201 to 2000. Further, in the embodiment of FIG. 5, the remaining tickets may be allocated to data (100 types of data) transmitted from the sensors having the sensor IDs 0101 to 0200 by twos, or it may be possible for the remaining tickets to be allocated to data (200 types of data) transmitted from the sensors having the sensor IDs 0101 to 0300 by ones.

The calculated ticket distribution may be stored in the data collection and memory unit 31e as a ticket distribution table, and when the ticket distribution is performed, the monitored data writing unit 31d may write monitored data of a next period to the cache memory 32 after the ticket distribution is performed based on the ticket distribution table stored in the data collection and memory unit 31e. Further, in the embodiment of FIG. 5, when the ticket distribution is not performed, the monitored data writing unit 31d may not write the monitored data to the cache memory 32. Since the monitored data rate of each period is not abruptly changed, it may not be bad to write the monitored data of a next period to the cache memory 32 after the ticket distribution is performed. Further, in this embodiment, a monitored data rate may be calculated from the received monitored data during the one period, and the ticket distribution may be stopped for the next one period (one second) based on the calculated monitored data rate. That is, the received monitored data during the one period (one second) may be temporarily stored in a buffer memory, the monitored data rate may be calculated from the monitored data stored in the buffer memory, and the tickets with respect to the monitored data stored in the buffer memory may be distributed based on the calculated monitored data rate. Accordingly, the buffer memory may be required, but, the tickets may be more accurately distributed.

Thus, the write of the monitored data may be sequentially and repeatedly performed every period for 10 periods (10 seconds), and the monitored data for a total of 10 periods may be written to the cache memory 32. Next, the accumulative data writing unit 33a may read the monitored data for 10 periods stored in the cache memory 32 every 10 periods, that is, every 10 seconds, after performing a data compression process to the read monitored data and write and accumulate the compressed monitored data to the database 34, which is an accumulative memory unit consisting of a non-volatile memory such as an HDD, etc. via the network 60. At this time, the monitoring unit 33b may monitor an amount of the accumulated data transmitted from the cache memory 32 to the database 34, and when the transmitted amount of accumulated data is determined to be exceeded a predetermined amount, the monitoring unit 33b controls the accumulative data writing unit 33a to extend a period in which the monitored data written to the cache memory 32 is read and writes the monitored data to the database 34 according to the amount of the accumulated data transmitted to the database 34. Accordingly, the system down, etc. due to the transmitted amount of accumulated data exceeding a predetermined amount can be prevented. Thus, the write of the monitored data may be sequentially and repeatedly performed every one period for 10 periods (for 10 seconds), and a data collection operation of overwriting the monitored data for a total of 10 periods to the cache memory 32 and a data accumulation operation of reading the monitored data for 10 periods written to the cache memory 32 every 10 seconds and writing and accumulating the read monitored data to the database 34 may be repeated and performed.

In addition, in this embodiment, the accumulative data writing unit 33a may read the monitored data of 10 periods written to the cache memory 32 every time (10 seconds) corresponding to 10 periods, and may write the read monitored data to the database 34. The accumulative data writing unit 33a may also be configured to read the monitored data during the one period written to the cache memory 32 every time (1 second) corresponding to one period and write the read monitored data to the database 34, or read monitored data for any given period written to the cache memory 32 every arbitrary period, and to write the read monitored data to the database 34.

Moreover, in this embodiment, when instrument parameters indicating a temperature setting value, a pressure setting value, etc. are input by the operator or the processing recipe, the indicated instrument parameters such as the temperature setting value and the pressure setting value, etc. together with an indicated time may be received at the monitored data receiving unit 31a, for example, may be written to another cache memory other than the cache memory 32, and the indicated time of the instrument parameters and the instrument parameters may be read from the other cache memory and written and preserved to the database 34. In this way, the analysis application apparatus 50, etc. may compare and analyze a generation time of the monitored data receiving at the monitored data receiving unit 31a and the indicated time of the instrument parameters.

As described above, in this embodiment, the total number of times each type of monitored data is changed by the predetermined change amount or more every one period (one second) which is the first time period may be calculated as a monitored data rate, the tickets may be assigned and distributed as the number of times each type of the monitored data is written to the cache memory 32 during the one period for one second which is the second time period based on the calculated monitored data rate and a data writing upper limit which is an amount of monitored data capable of being written to the cache memory 32 during the one period, and the monitored data during the one period may be written to the cache memory 32 for one second which is the second time period based on the assigned tickets. The write of the monitored data may be repeatedly performed for 10 periods (10 seconds), and the monitored data of a total of 10 periods may be written to the cache memory 32. Accordingly, the monitored data for 10 continuous periods in time sequence may be written to the cache memory 32 of this embodiment. The monitored data of 10 periods written to the cache memory 32 may be read whenever the third time period which is equal to 10 periods elapses, that is, read every 10 seconds, and written and accumulated to the database 34 which is the accumulative memory unit.

A Second Embodiment

Next, a second embodiment will be described with reference to FIG. 6. FIG. 6 illustrates a monitored data writing allocation table during the one period (one second in the example of FIG. 6) stored in the data collection and memory unit 31e, which is a ticket distribution table for writing the monitored data during the one period (one second), according to the second embodiment of the present invention. In FIG. 6, the priority may be set with respect to each of 500 sensors transmitting the monitored data, and tickets may be distributed. The ticket distribution is shown with check marks. In the embodiment of FIG. 6, the tickets may be distributed every 100 ms with respect to data transmitted from every sensor having the order of priorities 1 to 3, and 5000 tickets may be distributed during the one period.

In the second embodiment, prerequisites may be set as follows. (1) There may be 500 sensors transmitting the monitored data, and the sensor IDs may be 0001 to 0500. (2) A period of writing the monitored data transmitted from the 500 sensors to the cache memory 32 may be one second. That is, after writing every type of monitored data corresponding to the tickets distributed based on the ticket distribution to the cache memory 32, a period until the monitored data of an amount corresponding to the tickets distributed based on a next ticket distribution is written to the cache memory 32 may be one second. (3) A data writing upper limit of the cache memory 32 may be 5000 points/sec. That is, the write of the data to the cache memory 32 may be performed a maximum of 5000 times in one second. The data writing upper limit may be determined by the cache memory 32 or a central processing unit (CPU) which writes the data to the cache memory 32. Accordingly, there may be 5000 tickets distributing a monitored data writing timing to the cache memory 32. (4) Data with the first priority may be data transmitted from the sensor having a sensor ID beginning from 0001, and a change of the data may be written to the cache memory 32.

In the second embodiment, a detailed description of the accumulation of the monitored data rate and the ticket distribution is as follows. In the embodiment of FIG. 6, since each type of monitored data from 500 sensors changes by the predetermined change amount or more for every 100 ms, the monitored data rate is 500×1 sec/0.1 sec=5000/sec. This may be equal to 5000 points/sec which is a data writing upper limit of the cache memory 32, and may be equal to or less than the data writing upper limit. Accordingly, every type of monitored data transmitted from the 500 sensors may be written to the cache memory 32. As a result, 10 tickets per one type of data may be distributed to the monitored data transmitted from the 500 sensors.

The calculated ticket distribution may be stored in the data collection and memory unit 31e, and when the ticket distribution is performed, the monitored data writing unit 31d may write monitored data of a next period to the cache memory 32 after the ticket distribution is performed based on the ticket distribution stored in the data collection and memory unit 31e. Thus, the write of the monitored data may be sequentially and repeatedly performed every period for 10 periods (10 seconds), and the monitored data for a total of 10 periods may be written to the cache memory 32.

Next, the accumulative data writing unit 33a may read the monitored data for 10 periods written to the cache memory 32 every 10 periods, that is, every 10 seconds, and after performing a data compression operation, etc. to the read monitored data, write and accumulate the compressed data to the database 34 which is the accumulative memory unit consisting of a non-volatile memory such as an HDD, etc. via the network 60.

A Third Embodiment

Next, a third embodiment will be described with reference to FIG. 7. FIG. 7 illustrates a monitored data writing allocation table during the one period (one second in the example of FIG. 7) stored in the data collection and memory unit 31e, which is a ticket distribution table for writing the monitored data during the one period (for one second), according to the third embodiment of the present invention. In FIG. 7, the priority may be set with respect to each of 1500 sensors transmitting the monitored data, and tickets are distributed. The ticket distribution is shown with check marks.

For example, the tickets may be distributed to data transmitted from the sensor having a sensor ID 0001 of the first priority every 100 ms, and the number of tickets during the one period may be 10 for each data. The tickets may be distributed to data transmitted from each of sensors having sensor IDs 0002 to 0006 of the second priority every 200 ms or 300 ms, and the number of tickets during the one period may be 4 for each type of data. The tickets may be distributed to data transmitted from each sensor having one of sensor IDs 1499 and 1500 of the third priority every 300 ms or 400 ms, and the number of tickets during the one period may be 3 for each type of data.

In the third embodiment, prerequisites may be set as follows. (1) There may be 1500 sensors transmitting the monitored data, and the sensor IDs may be 0001 to 1500. (2) A period of writing the monitored data transmitted from the 1500 sensors to the cache memory 32 may be one second. That is, after writing every type of monitored data of an amount corresponding to the tickets distributed based on the ticket distribution to the cache memory 32, a period until the monitored data of an amount corresponding to the tickets distributed based on a next ticket distribution is written to the cache memory 32 may be one second. (3) A data writing upper limit of the cache memory 32 may be 5000 points/sec. That is, the write of the data may be performed at most 5000 times in the cache memory 32 in one second. The data writing upper limit may be determined by the cache memory 32 or a central processing unit (CPU), etc. which writes the data to the cache memory 32. Accordingly, there may be 5000 tickets distributing a monitored data writing timing to the cache memory 32. (4) Data with first priority may be data transmitted from the sensor having the sensor ID 0001, and a change of the data may be recorded in the cache memory 32.

Under the prerequisites described above, in the embodiment of FIG. 7, the monitored data rate detection unit 31b may accumulate a monitored data rate which is monitored data collection points per one period (one second) every one period (one second), and the monitored data writing allocation unit 31c may allocate and distribute the tickets corresponding to one period (one second) to each type of monitored data of a next one period (one second) based on the accumulated monitored data rate. A detailed description of the accumulation of the monitored data rate and the ticket distribution is as follows. (1) In an embodiment of FIG. 7, since each type of the monitored data from 1500 sensors changes by the predetermined change amount or more for every 100 ms, the monitored data rate is 1500×1 sec/0.1 sec=15000/sec.

(2) The data with the first priority may be data transmitted from the sensor having the sensor ID 0001, and since every change of the data may be written to the cache memory 32, the data transmitted from the sensor with the first priority may be updated every 100 ms, that is, be written to the cache memory 32 every 100 ms. Accordingly, 10 tickets may be distributed to the data transmitted from the sensor with the first priority.

(3) Data excluding the data transmitted from the sensor with the first priority may be 1499 types of data transmitted from the sensors having sensor IDs 0002 to 1500, and the 4990 remaining tickets may be allocated to the 1499 types of data at equal time intervals by a round robin method after the allocation in (2) above. Accordingly, since 3 tickets are distributed to each type of data excluding the data transmitted from the sensor with the first priority, 4497 tickets (1499×3=4497) may be distributed to every type of data excluding the data transmitted from the sensor with the first priority.

(4) Further, after the allocation in (3) above, the 493 (5000−10−4497=493) remaining tickets may be allocated to data excluding the data transmitted from the sensor with the first priority in increasing order of the sensor IDs to have as similar time intervals as possible. The data to which the remaining tickets are allocated may be data with the second priority, and data to which the remaining tickets are not allocated may be data with the third priority. In the embodiment of FIG. 7, since the 493 remaining tickets are allocated to each type of data (493) from sensors having the sensor IDs 0002 to 0494 by ones, the data with the second priority may be data transmitted from sensors having sensor IDs 0002 to 0494, and the data with the third priority may be data (1006) transmitted from sensors having sensor IDs 0495 to 1500.

The calculated ticket distribution may be stored in the data collection and memory unit 31e, and when the ticket distribution is performed, the monitored data writing unit 31d may write monitored data of a next period to the cache memory 32 after the ticket distribution is performed based on the ticket distribution stored in the data collection and memory unit 31e. Accordingly, the write of the monitored data may be sequentially and repeatedly performed for 10 periods (10 seconds), and the monitored data for a total of 10 periods may be written to the cache memory 32.

Next, the accumulative data writing unit 33a may read the monitored data for 10 periods written to the cache memory 32 every 10 periods, that is, every 10 seconds, and after performing a data compression operation, etc. to the read monitored data, write and accumulate the compressed data to the database 34 which is an accumulative memory unit consisting of a non-volatile memory such as an HDD, etc. via the network 60.

According to the embodiments described above, effects of the following (1) to (4) may be obtained. (1) Since the ticket distribution is performed based on the data writing upper limit capable of being stored in the temporary memory unit and the monitored data rate, even when the amount of monitored data from the sensors is increased, it is possible to set an amount of the monitored data capable of being stored in the temporary memory unit as a proper value, and to respond to an increase of an amount of the monitored data from the sensors. Accordingly, leakage of data accumulation or a system down can be prevented. (2) Since the number of times (storing frequency) a type of monitored data with high priority is written to the temporary memory unit is greater than the number of times (storing frequency) a type of monitored data with low priority is written to the temporary memory unit, it is possible to optimize an amount of the monitored data stored in the temporary memory unit according to the priority of the monitored data. (3) A first number of times (a first storing frequency) the monitored data with the first priority is written to the temporary memory unit is allocated to the monitored data with the first priority, a second number of times (a second storing frequency) the monitored data with the second priority and the third priority is written, which is the difference between the data writing upper limit and the first number of times, is allocated to the monitored data with the second priority and the third priority, and a third number of times (a third storing frequency) the monitored data with the second priority is written, which is the difference between the data writing upper limit and a sum of the first number of times and the second number of times, is allocated to the monitored data with the second priority. Therefore, it may be possible to optimize an amount of data stored in the temporary memory unit according to the priority of the monitored data, and the tickets may be used with none remaining since the total number of distributed tickets may be equal to the data writing upper limit. (4) When the amount of the accumulated data transmitted from the temporary memory unit to the accumulation and memory unit exceeds the predetermined amount, a period of reading the monitored data from the temporary memory unit and writing the read monitored data to the accumulative memory unit is extended. Therefore, the system down occurring when the transmitted amount of the accumulated data exceeds the predetermined amount is prevented.

The present invention is not limited to the embodiments, and it will be apparent to those skilled in the art that various modifications can be made to the above-described embodiments of the present invention without departing from the spirit or scope of the invention. The data collecting and accumulating unit 30 is disposed in the substrate processing apparatus in the above-described embodiments, and it may be disposed outside the substrate processing apparatus. For example, the data collecting and accumulating unit 30 may be connected to the substrate processing apparatus installed inside a clean room using a LAN, or be disposed as a management apparatus outside the clean room. The present invention may be applied to not only a semiconductor manufacturing apparatus, but also an apparatus for processing a glass substrate such as a liquid crystal display (LCD) apparatus, or another substrate processing apparatus. The processing of the substrate may be a film forming process of performing chemical vapor deposition (CVD), physical vapor deposition (PVD), atomic layer deposition (ALD), and forming an epitaxial growth film, an oxide film, a nitride film, a metal-containing film, etc., an annealing process, an oxidation process, a diffusion process, an etching process, an exposure process, a photolithography process, a coating process, a molding process, a developing process, a dicing process, a wire bonding process, an inspection process, etc.

According to the present invention, even when an amount of monitored data is increased from a sensor, leakage of data accumulation and a system down can be prevented.

A substrate processing system for collecting and accumulating various monitored data, for example, monitored data such as a processing temperature or a pressure in a processing chamber, etc., which is outputted from a substrate processing apparatus processing a substrate, for example, a semiconductor wafer is provided.

Preferred embodiments of the present invention are added.

(Supplementary Note 1)

According to one embodiment of the present invention, there is provided a substrate processing system including a substrate processing apparatus configured to process a substrate;

a monitored data receiving unit configured to receive a plurality of types of monitored data outputted from the substrate processing apparatus;

a temporary memory unit configured to periodically store the plurality of types of monitored data received by the monitored data receiving unit;

a monitored data rate detection unit configured to detect, as a monitored data rate, a total number of times each type of monitored data received by the monitored data receiving unit changes during a first time period by more than a predetermined amount;

a monitored data writing allocation unit configured to allocate, to each type of monitored data, a storing frequency corresponding to number of times each type of monitored data of one period is written to the temporary memory unit during a second time period based on the monitored data rate detected by the monitored data rate detection unit and an upper limit of the storing frequency corresponding to a total storing frequency of the monitored data stored in the temporary memory unit during the one period;

a monitored data writing unit configured to write the plurality of types of monitored data received by the monitored data receiving unit to the temporary memory unit during the second time period based on the storing frequency allocated by the monitored data writing allocation unit;

an accumulative memory unit configured to store the plurality of types of monitored data stored in the temporary memory unit for a plurality of periods; and an accumulative data writing unit configured to read the plurality of types of monitored data stored in the temporary memory unit for every third time period and to store the monitored data in the accumulative memory unit.

Here, the first time period and the second time period may be equal. The second time period and the third time period may be equal. However, it may be desirable that the third time period be greater than the second time period to reduce the amount of data transmitted from the temporary memory unit to the accumulative memory unit.

(Supplementary Note 2)

In the substrate processing system of Supplementary note 1, the substrate processing system may further include a priority memory unit configured to store a priority of each type of monitored data for writing the plurality of types of monitored data to the temporary memory unit, wherein the monitored data writing allocation unit allocates a higher storing frequency to a type of monitored data with high priority for writing to the temporary memory unit during the second time period and a lower storing frequency to a type of monitored data with low priority for writing to the temporary memory unit during the second time period, based on the priority of each type of monitored data stored in the priority memory unit.

(Supplementary Note 3)

In the substrate processing system of Supplementary note 1, wherein the substrate processing system may further include a priority memory unit configured to store a priority of each type of monitored data when the plurality of types of monitored data are stored into the temporary memory unit, wherein the monitored data writing allocation unit allocates the storing frequency for writing the plurality of types of monitored data to the temporary memory unit during the second time period, based on the upper limit of the storing frequency, the monitored data rate and the priority stored in the priority memory unit.

(Supplementary Note 4)

In the substrate processing system of the supplementary note 3, it is preferable that the priority of each type of monitored data is one of a first priority, a second priority and a third priority, and the monitored data writing allocation unit allocates a first storing frequency to a type of monitored data with the first priority, a second storing frequency to a type of monitored data with the second priority and a type of monitored data with the third priority wherein the second storing frequency is equal to or less than a difference between the first storing frequency and the upper limit of the storing frequency, and a third storing frequency to the type of monitored data with the second priority wherein the third storing frequency is equal to a difference between the upper limit of the storing frequency and a sum of the first storing frequency and the second storing frequency.

(Supplementary Note 5)

In the substrate processing system of any one of Supplementary notes 1 to 4, the substrate processing system may further include a monitoring unit configured to monitor an amount of accumulated data transmitted from the temporary memory unit to the accumulative memory unit, wherein the accumulative data writing unit is configured to extend a period of storing the plurality of types of monitored data in the temporary memory unit to the accumulative memory unit when the monitoring unit determines the amount of accumulated data is greater than a predetermined amount.

(Supplementary Note 6)

According to another embodiment of the present invention, there is provided a monitored data collection and accumulative system, including:

a monitored data receiving unit configured to receive a plurality of types of monitored data outputted from the outside;

a substrate processing apparatus configured to process a substrate;

a monitored data receiving unit configured to receive a plurality of types of monitored data outputted from the substrate processing apparatus;

a temporary memory unit configured to periodically store the plurality of types of monitored data received by the monitored data receiving unit;

a monitored data rate detection unit configured to detect, as a monitored data rate, a total number of times each type of monitored data received by the monitored data receiving unit changes during a first time period by more than a predetermined amount;

a monitored data write allocation unit configured to allocate, to each type of monitored data, a storing frequency corresponding to number of times each type of monitored data of one period is written to the temporary memory unit during a second time period based on the monitored data rate and an upper limit of the storing frequency corresponding to a total storing frequency of the plurality of types of monitored data stored in the temporary memory unit during the one period;

a monitored data writing unit configured to write the plurality of types of monitored data received by the monitored data receiving unit to the temporary memory unit during the second time period based on the storing frequency;

an accumulative memory unit configured to accumulatively store the plurality of types of monitored data stored in the temporary memory unit for a plurality of periods; and an accumulative data writing unit configured to read the plurality of types of monitored data stored in the temporary memory unit for every third time period and to store the monitored data in the accumulative memory unit.

(Supplementary Note 7)

According to still another embodiment of the present invention, there is provided a monitored data collecting and accumulating method or program of a substrate processing system, including:

(a) receiving a plurality of types of monitored data outputted from a substrate processing apparatus configured to process a substrate;

(b) detecting, as a monitored data rate, a total number of times each type of monitored data received in the step (a) changes during a first time period by more than a predetermined amount;

(c) allocating, to each type of monitored data, a storing frequency corresponding to number of times each type of monitored data of one period is written to a temporary memory unit during a second time period based on the monitored data rate detected in the step (b) and an upper limit of the storing frequency corresponding to a total storing frequency of the plurality of types of monitored data stored in the temporary memory unit during the one period;

(d) writing the plurality of types of monitored data outputted from the substrate processing apparatus to the temporary memory unit during the second time period based on the storing frequency allocated in the step (c); and (e) reading the plurality of types of monitored data from the temporary memory unit for every third time period and writing the plurality of types of monitored data to the accumulative memory unit.

(Supplementary Note 8)

According to yet another embodiment of the present invention, there is provided a substrate processing apparatus, including:

a main control unit;

a monitored data receiving unit configured to receive a plurality of types of monitored data outputted from the main control unit;

a temporary memory unit configured to periodically store the plurality of types of monitored data received by the monitored data receiving unit;

a monitored data rate detection unit configured to detect, as a monitored data rate, a total number of times each type of monitored data received by the monitored data receiving unit changes during a first time period by more than a predetermined amount;

a monitored data writing allocation unit configured to allocate, to each type of monitored data, a storing frequency corresponding to number of times each type of monitored data of one period is written to the temporary memory unit during a second time period based on the monitored data rate detected by the monitored data rate detection unit and an upper limit of the storing frequency corresponding to a total storing frequency of the monitored data stored in the temporary memory unit during the one period;

a monitored data writing unit configured to write the plurality of types of monitored data received by the monitored data receiving unit to the temporary memory unit during the second time period based on the storing frequency allocated by the monitored data writing allocation unit;

an accumulative memory unit configured to store the plurality of types of monitored data stored in the temporary memory unit for a plurality of periods; and an accumulative data writing unit configured to read the plurality of types of monitored data stored in the temporary memory unit for every third time period and to store the monitored data in the accumulative memory unit.

(Supplementary Note 9)

In the substrate processing apparatus of Supplementary note 8, the substrate processing apparatus may further include a priority memory unit configured to store a priority of each type of monitored data for writing the plurality of types of monitored data to the temporary memory unit, wherein the monitored data writing allocation unit allocates a higher storing frequency to a type of monitored data with high priority higher for writing the plurality of types of monitored data to the temporary memory unit during the second time period and a lower storing frequency to a type of monitored data with low priority for writing the plurality of types of monitored data to the temporary memory unit during the second time period, based on the priority stored in the priority memory unit.

(Supplementary Note 10)

In the substrate processing apparatus of Supplementary note 8, the substrate processing apparatus may further include a priority memory unit configured to store a priority of each type of monitored data for writing the plurality of types of monitored data to the temporary memory unit, wherein the monitored data writing allocation unit allocates the storing frequency for writing the plurality of types of monitored data to the temporary memory unit during the second time period, based on the upper limit of the storing frequency, the monitored data rate and the priority stored in the priority memory unit.

(Supplementary Note 11)

In the substrate processing apparatus of Supplementary note 10, the priority of each type of monitored data may be one of a first priority, a second priority and a third priority, and the monitored data writing allocation unit may allocate a first storing frequency to a type of monitored data with the first priority, a second storing frequency to a type of monitored data with the second priority and a type of monitored data with the third priority wherein the second storing frequency is equal to or less than a difference between the first storing frequency and the upper limit of the storing frequency, and a third storing frequency to the type of monitored data with the second priority wherein the third storing frequency is equal to a difference between the upper limit of the storing frequency and a sum of the first storing frequency and the second storing frequency.

(Supplementary Note 12)

In the substrate processing apparatus of any one of Supplementary notes 8 to 10, the substrate processing apparatus may further include:

a monitoring unit configured to monitor an amount of accumulated data transmitted from the temporary memory unit to the accumulative memory unit, wherein the accumulative data writing unit is configured to extend a period of storing the plurality of types of monitored data in the temporary memory unit to the accumulative memory unit when the monitoring unit determines the amount of accumulated data is greater than a predetermined amount.

What is claimed is:

1. A substrate processing system comprising:

a substrate processing apparatus configured to process a substrate and collect and output a plurality of types of data by monitoring a processing of the substrate;

a data receiving unit configured to receive the plurality of types of data outputted from the substrate processing apparatus;

a temporary memory unit configured to periodically store the plurality of types of data received by the data receiving unit;

a data rate detection unit configured to detect, as a data rate, a total number of times each type of data received by the data receiving unit changes during a first time period by more than a predetermined amount;

a data writing allocation unit configured to allocate, to each type of data, a storing frequency corresponding to number of times each type of data of one period is written to the temporary memory unit during a second time period based on the data rate detected by the data rate detection unit and an upper limit of the storing frequency corresponding to a total storing frequency of the data stored in the temporary memory unit during the one period;

a data writing unit configured to write the plurality of types of data received by the data receiving unit to the temporary memory unit during the second time period based on the storing frequency allocated by the data writing allocation unit;

an accumulative memory unit configured to store the plurality of types of data stored in the temporary memory unit for a plurality of periods; and an accumulative data writing unit configured to read the plurality of types of data stored in the temporary memory unit for every third time period and to store the data in the accumulative memory unit.

2. The substrate processing system of claim 1, further comprising:

a priority memory unit configured to store a priority of each type of data for writing the plurality of types of data to the temporary memory unit, wherein the data writing allocation unit allocates a higher storing frequency to a type of data with high priority for writing to the temporary memory unit during the second time period and a lower storing frequency to a type of data with low priority for writing to the temporary memory unit during the second time period, based on the priority of each type of data stored in the priority memory unit.

3. The substrate processing system of claim 1, further comprising:

a priority memory unit configured to store a priority of each type of data for writing the plurality of types of data to the temporary memory unit, wherein the data writing allocation unit allocates the storing frequency for writing the plurality of types of data to the temporary memory unit during the second time period, based on the upper limit of the storing frequency, the data rate and the priority stored in the priority memory unit.

4. The substrate processing system of claim 3, wherein the priority of each type of data is one of a first priority, a second priority and a third priority, and the data writing allocation unit allocates a first storing frequency to a type of data with the first priority, a second storing frequency to a type of data with the second priority and a type of data with the third priority wherein the second storing frequency is equal to or less than a difference between the first storing frequency and the upper limit of the storing frequency, and a third storing frequency to the type of data with the second priority wherein the third storing frequency is equal to a difference between the upper limit of the storing frequency and a sum of the first storing frequency and the second storing frequency.

5. The substrate processing system of claim 1, further comprising:

a monitoring unit configured to monitor an amount of accumulated data transmitted from the temporary memory unit to the accumulative memory unit, wherein the accumulative data writing unit is configured to extend a period of storing the plurality of types of data in the temporary memory unit to the accumulative memory unit when the monitoring unit determines the amount of accumulated data is greater than a predetermined amount.

6. A substrate processing apparatus comprising:

a main control unit configured to collect and output a plurality of types of data by monitoring a processing of a substrate;

a data receiving unit configured to receive the plurality of types of data outputted from the main control unit;

a temporary memory unit configured to periodically store the plurality of types of data received by the data receiving unit;

a data rate detection unit configured to detect, as a data rate, a total number of times each type of data received by the data receiving unit changes during a first time period by more than a predetermined amount;

a data writing allocation unit configured to allocate, to each type of data, a storing frequency corresponding to number of times each type of data of one period is written to the temporary memory unit during a second time period based on the data rate detected by the data rate detection unit and an upper limit of the storing frequency corresponding to a total storing frequency of the data stored in the temporary memory unit during the one period;

a data writing unit configured to write the plurality of types of data received by the data receiving unit to the temporary memory unit during the second time period based on the storing frequency allocated by the data writing allocation unit;

an accumulative memory unit configured to store the plurality of types of data stored in the temporary memory unit for a plurality of periods; and an accumulative data writing unit configured to read the plurality of types of data stored in the temporary memory unit for every third time period and to store the data in the accumulative memory unit.

7. The substrate processing apparatus of claim 6, further comprising:

a priority memory unit configured to store a priority of each type of data for writing the plurality of types of data to the temporary memory unit, wherein the data writing allocation unit allocates a higher storing frequency to a type of data with high priority higher for writing the plurality of types of data to the temporary memory unit during the second time period and a lower storing frequency to a type of data with low priority for writing the plurality of types of data to the temporary memory unit during the second time period, based on the priority stored in the priority memory unit.

8. The substrate processing apparatus of claim 6, further comprising:

a priority memory unit configured to store a priority of each type of data for writing the plurality of types of data to the temporary memory unit, wherein the data writing allocation unit allocates the storing frequency for writing the plurality of types of data to the temporary memory unit during the second time period, based on the upper limit of the storing frequency, the data rate and the priority stored in the priority memory unit.

9. The substrate processing apparatus of claim 8, wherein the priority of each type of data is one of a first priority, a second priority and a third priority, and the data writing allocation unit allocates a first storing frequency to a type of data with the first priority, a second storing frequency to a type of data with the second priority and a type of data with the third priority wherein the second storing frequency is equal to or less than a difference between the first storing frequency and the upper limit of the storing frequency, and a third storing frequency to the type of data with the second priority wherein the third storing frequency is equal to a difference between the upper limit of the storing frequency and a sum of the first storing frequency and the second storing frequency.

10. The substrate processing apparatus of claim 6, further comprising:
a monitoring unit configured to monitor an amount of accumulated data transmitted from the temporary memory unit to the accumulative memory unit,
wherein the accumulative data writing unit is configured to extend a period of storing the plurality of types of data in the temporary memory unit to the accumulative memory unit when the monitoring unit determines the amount of accumulated data is greater than a predetermined amount.

* * * * *